Oct. 20, 1970    R. J. VIGNERI ET AL    3,535,040
ANGULAR RATE SENSING AND INERTIAL DEVICE USING A LASER RING

Filed May 11, 1966    3 Sheets-Sheet 1

INVENTORS
RONALD J. VIGNERI
LOUIS A. MORINE
FRANK A. HANUSEK
BY Herbert L. Davis
ATTORNEY

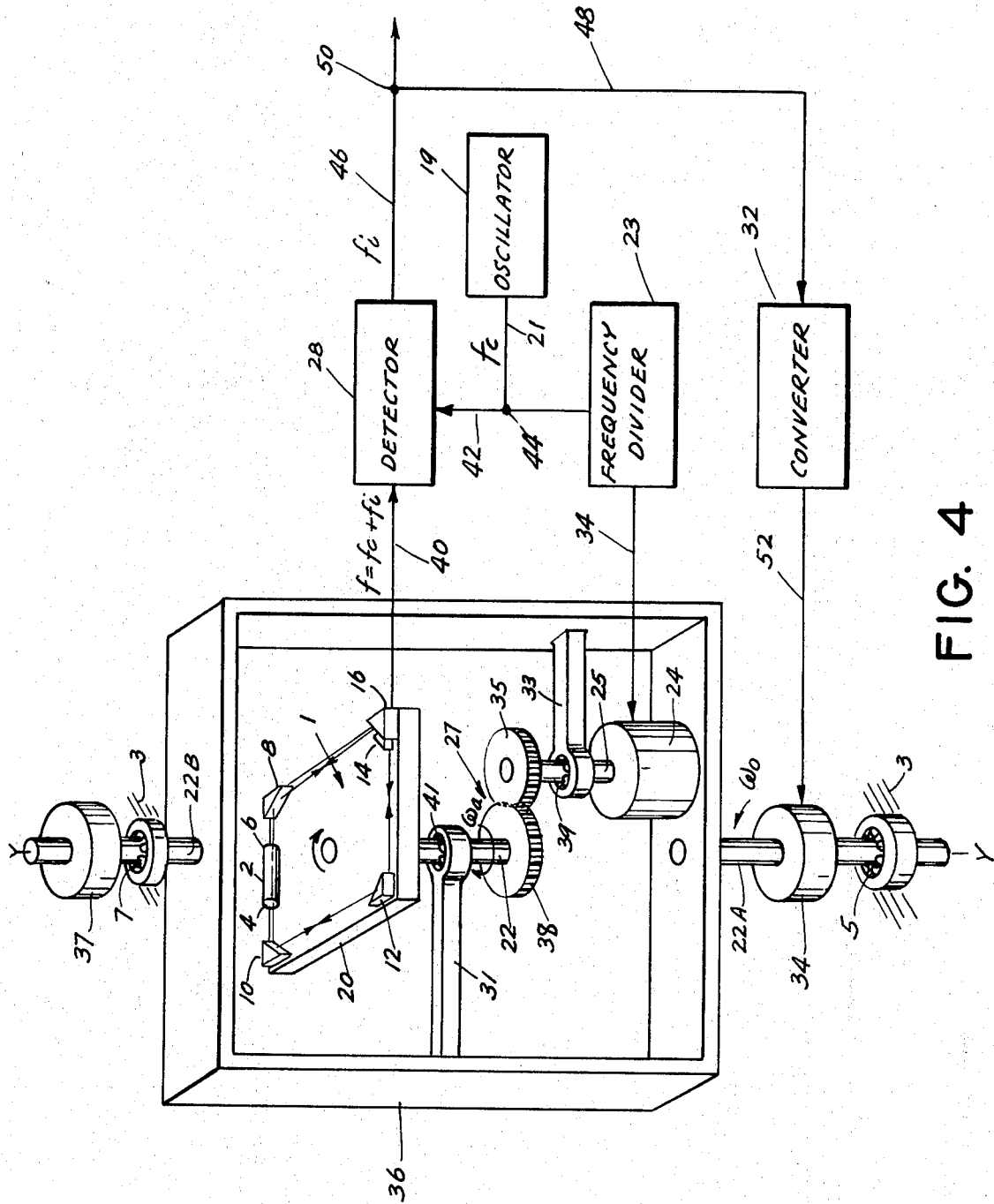

United States Patent Office 3,535,040
Patented Oct. 20, 1970

3,535,040
ANGULAR RATE SENSING AND INERTIAL DEVICE USING A LASER RING
Ronald J. Vigneri, Hawthorne, and Louis A. Morine, Mahwah, N.J., and Frank A. Hanusek, Brookline, Mass., assignors to The Bendix Corporation, a corporation of Delaware
Filed May 11, 1966, Ser. No. 549,356
Int. Cl. H04b 9/00; G01b 9/02; H01s 3/00
U.S. Cl. 356—106                                              2 Claims

ABSTRACT OF THE DISCLOSURE

Apparatus including a laser ring supported so as to be sensitive to inertial rate of rotation and rotated at a predetermined angular rate whereby an electrical output corresponding to the sum of the inertial and predetermined rotational rates is provided. An electrical output corresponding to the predetermined angular rate is subtracted from the electrical output provided by the laser ring, and the difference output is fed back to control the rotational rate of the laser ring.

---

This invention relates to an angular rate sensing device and, more particularly, to a device which utilizes a laser ring for angular rate sensing and inertial stabilization.

A laser ring has the characteristic of being able to sense small rotations relative to an inertial frame of reference, and may thus be considered as a massless gyroscope to be used for inertial stabilization. An inertial stabilization device of this type is advantageous as compared to conventional gyroscopic stabilization means. In particular, acceleration sensitive errors are negligible, gyroscopic drift is minimized and inertial stabilization is provided with mechanical simplicity.

One object of this invention is to use the characteristics of a laser ring for providing a highly accurate angular rate sensor having mechanical simplicity.

Another object of this invention is to sense angular rate relative to an inertial frame of reference.

Another object of this invention is to support a laser ring so that it is sensitive to inertial rate and to rotate the laser ring at a predetermined angular rate whereby an electrical output corresponding to the sum of the predeterimned rate and the inertial rate is provided. Electronic means are provided for algebraically subtracting an electrical output corresponding to the predetermined rate from the electrical output provided by the laser ring. The resulting output is fed back to control the angular rate of the laser ring.

This invention contemplates an inertial stabilization system comprising an oscillator for providing an electrical output at a predetermined frequency; a motor coupled to the oscillator and responsive to the electrical output therefrom for rotating at a predetermined rate; a laser ring supported so as to be sensitive to inertial rate; means for coupling the motor to the laser ring so that the laser ring rotates at a rate corresponding to the sum of of the predetermined rate and the inertial rate, with the laser ring providing an electrical output corresponding to the sum of the rates; a detector connected to the laser ring and connected to the oscillator for detecting the difference between the electrical outputs provided by the laser ring and the oscillator and for providing an electrical output corresponding to the difference; and means connected to the detector and connected to the laser ring and responsive to the electrical output from the detector for rotating the laser ring in a sense so as to counteract the inertial rate.

These and other objects and features of the invention are pointed out in the following description in terms of the embodiment thereof which is shown in the accompanying drawing.

Figure 2:
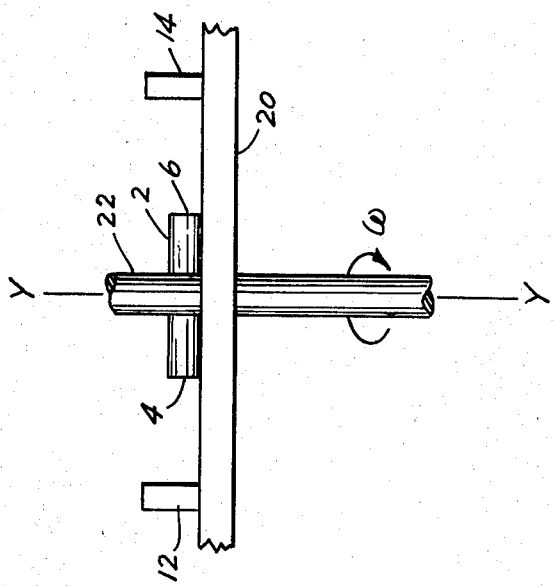
Figure 1:
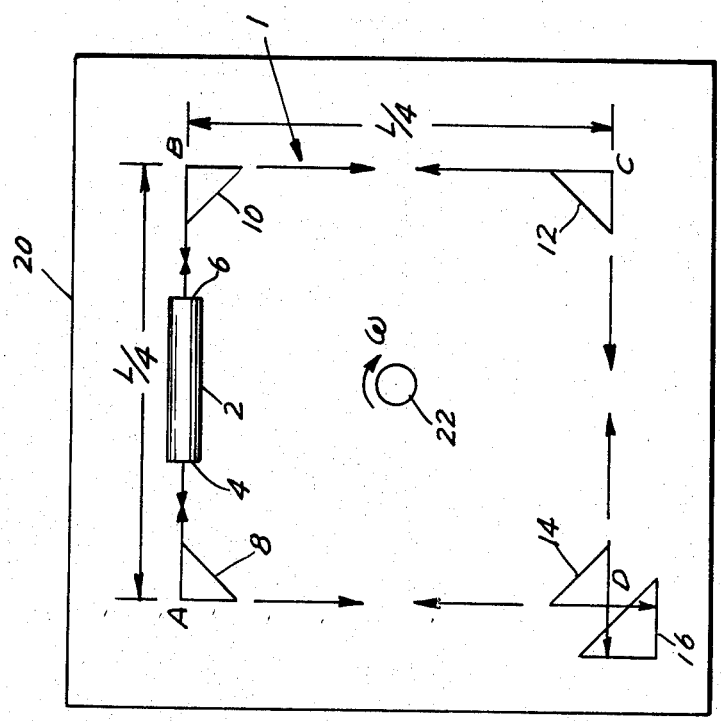
Figure 3:
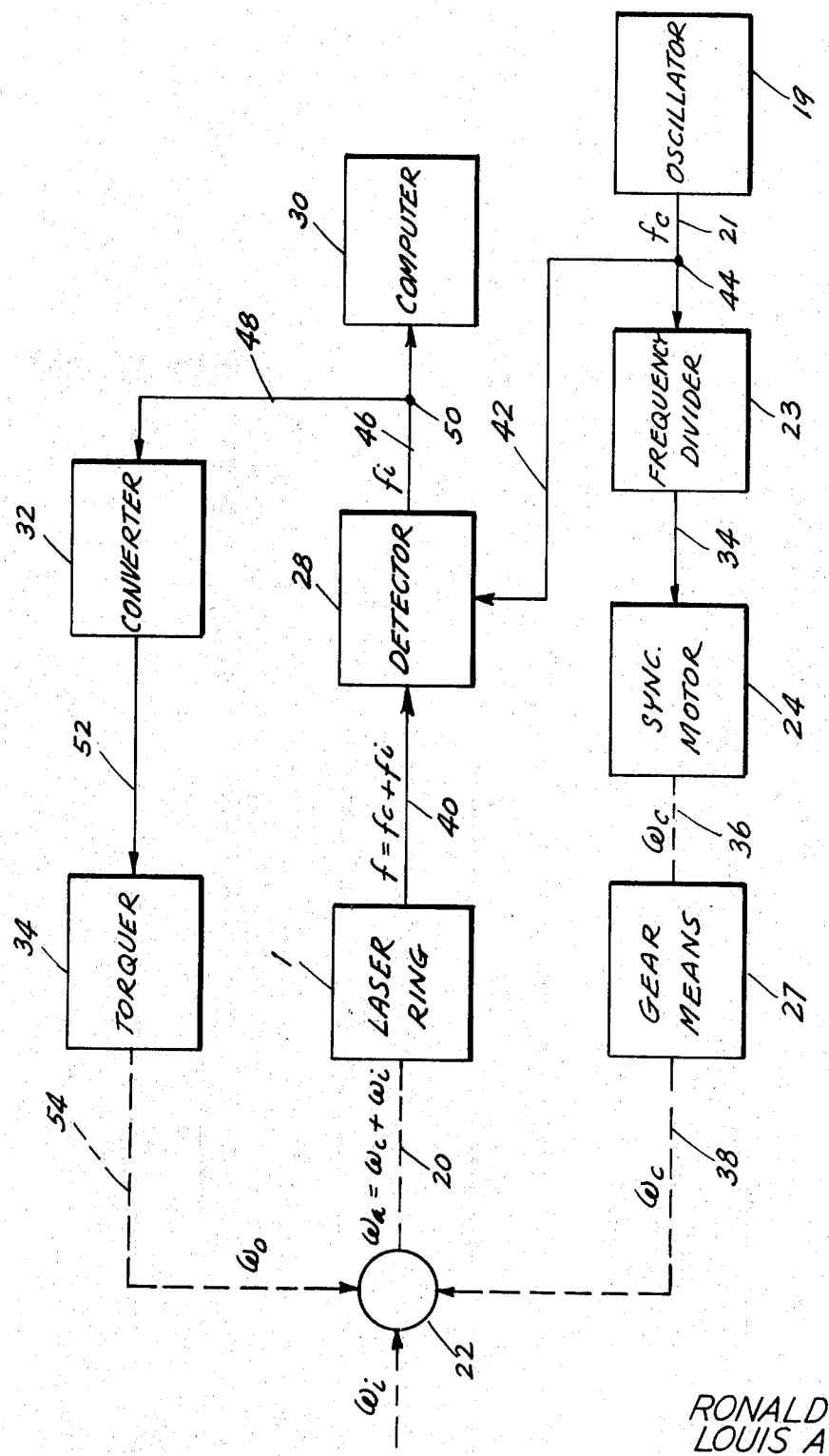

In the drawings:
FIG. 1 is a diagrammatic representaiton showing a plan view of a laser ring and its associated components arranged in accordance with the present invention.
FIG. 2 is a diagrammatic representation showing an end view of the laser ring arranged in accordance with the present invention.
FIG. 3 is a block diagram showing the inertial stabilization system constructed in accordance with the present invention.
FIG. 4 is a pictorial representation of a single axis stabilization system embodying the present invention.

A laser ring such as that used in the present invention is shown in FIG. 1 and designated generally by the numeral 1. Laser ring 1 is supported by a table 20 mounted on a rotatable shaft 22 and includes a tube 2 filled with a helium-neon gas mixture. A reflector 8, a a reflecting mirror 10, reflector 12 and a semi-transparent mirror 14 are mounted at the corners A, B, C and D, respectively, of a square ABCD, with the square ABCD having sides L/4 and a perimeter L so as to form an optical resonant cavity. When tube 2 is energized, the laser ring 1 breaks into oscillation, generating at each of its ends 4 and 6 a continuous light beam of a predetermined frequency and a wave length. The beam at the end 4 of tube 2 travels around the perimeter L of the square ABCD in a counterclockwise direction and the beam at the end 6 of tube 2 travels around the perimeter L of the square ABCD in a clockwise direciton.

At the semi-transparent mirror 14, at the corner D of the square ABCD, the two beams, i.e. the clockwise and counterclockwise traveling beams, are picked off through the semi-transparent mirror 14 by the photodetector 16 which senses the beams, provides corresponding electrical signals and mixes the signals to provide a combined electrical output. Actually, very little of the energy in the beams reaches the photodetector 16, with most of the energy being reflected by the semi-transparent mirror 14 back into the optical cavity defined by the square ABCD as feedback to sustain the oscillation of the light beams in the laser ring 1.

As in any oscillating system, the feedback must be in phase with the input. The system will oscillate only when there is an integral number of waves in the optical cavity in both directions. The number of waves depends on the length of the optical cavity and, if this length changes, oscillation will continue only if the wavelength changes, so that an integral number of waves is maintained.

When shaft 22 and table 20 are not rotating, the length of the optical cavity defined by the square ABCD is the same in the clockwise and counterclockwise directions, and the frequency of the signals corresponding to the light beams from ends 4 and 6 of tube 2 as detected by photodetector 16 is the same. When table 20 rotates with shaft 22 in a clockwise direction about axis Y—Y of shaft 22 at an angular rate ω, the length of the optical cavity in the clockwise direction increases. The wavelength therefore expands to maintain an integral number of waves and consequently the frequency of the clockwise traveling beam from end 6 of tube 2 decreases. When table 20 rotates with shaft 22 in a counterclockwise direction, the length of the optical cavity in the counterclockwise direction decreases. The wavelength therefore comprresses to maintain an integral number of waves and the frequency of the counterclockwise traveling beam from end 4 of tube 2 increases. Photodetector 16, insensing the clockwise and counterclockwise traveling beams from ends 6 and 4 of tube 2 detects this difference in frequency and provides the combined output signal having a frequency as follows:

$$f = \frac{L\omega}{\lambda} \quad (1)$$

In Equation 1, L is the perimeter of the square ABCD, which defines the length of the optical cavity, $\omega$ is the angular rate of table 20 about the axis Y—Y of shaft 22, as shown in FIG. 2, and $\lambda$ equals the quiescent laser output wave length of the beams provided at ends 4 and 6 of tube 2.

For purposes of describing the present invention it is not deemed necessary to describe in more detail the characteristics of laser ring 1. It is to be noted, however, that these characteristics, as well as the derivation of Equation 1, are well known in the art and are set forth in full detail in an article entitled "Rotation Rate Sensing With Traveling-Wave Ring Lasers," by W. M. Macek and D. T. M. Davis, Jr., and published in Applied Physics Letters, vol. 2, No. 3, American Institute of Physics, Feb. 1, 1963.

The rate sensor of the present invention uses the laser ring 1 arranged in accordance with FIG. 1 and 2 in a manner shown in the block diagram of FIG. 3. An oscillator 19 is set to provide an electrical output having a predetermined carrier frequency $f_c$, with the electrical output being applied through an output conductor 21 to a frequency divider 23, which may be an astable multivibrator such as that generally described at page 440, Electronics For Scientists, Malmstadt et al., Benjamin, 1963. Frequency divider 23 provides at an output conductor 34 an electrical output which is applied through the output conductor 34 to a synchronous motor 24 for driving the synchronous motor 24 at an angular rate $\omega_c$. The relationship between frequency $f_c$ and angular rate $\omega_c$ is in accordance with Equation 1, which may be rewritten as follows:

$$f_c = \frac{L}{\lambda} \omega_c \quad (2)$$

Synchronous motor 24 is coupled through suitable mechanical means 36 to gear means 27 and gear means 27 is coupled through suitable mechanical means 38 to the shaft 22 for rotating the shaft 22 at the angular rate $\omega_c$. Shaft 22 is mounted so as to be sensitive to inertial rate $\omega_i$, with the actual angular rate $\omega_a$ of shaft 22 being equal to the algebraic summation of angular rate $\omega_c$ and inertial rate $\omega_i$. Laser ring 1, supported by table 20 which in turn is mounted on shaft 22, rotates at the angular rate $$\omega_a = \omega_c + \omega_i$$

The electrical output of laser ring 1, provided by photodetector 16 thereof shown in FIG. 1, at an output conductor 40, has a frequency $f = f_c + f_i$ wherein, in accordance with Equation 2, $f_c$ is the frequency of the electrical output of laser ring 1 due to the angular rate $\omega_c$, and $f_i$ is the frequency of the electrical output of laser ring 1 due to the inertial rate $\omega_i$.

The electrical output from laser ring 1 is applied through the conductor 40 to a detector 28 and the electrical output from the oscillator 19 is applied through the conductor 21 and a conductor 42 joining the conductor 21 at a point 44 to the detector 28. The detector 28 may be a digital counter, a computer or an electronic gating circuit of the type for detecting the algebraic difference between the electrical output from the laser ring 1 applied through the conductor 40 which has the frequency $$f = f_c + f_i$$

and the electrical output from oscillator 19 applied through the conductor 21 and the conductor 42 joining the conductor 21 at the point 44 which has the frequency $f_c$. The detector 28 provides at an electrical output conductor 46 an electrical output having the frequency $f_i$.

The electrical output provided by detector 28 may be applied through the output conductor 46 to a computer 30 which computes the inertial rate $\omega_i$ of laser ring 1 about axis Y—Y of shaft 22 in accordance with the relationship expressed by Equation 1, or the electrical output may be applied through a conductor 48 joining the conductor 46 at a point 50 to counteract the inertial rate $\omega_i$ so as to provide stabilization relative to inertial space. In the latter instance, the output of detector 28 is applied through the conductor 48 joining the conductor 46 at the point 50 to a converter 32. Converter 32 may be a device of the type which includes a circuit for converting the output of detector 28 to a direct current voltage proportional to the frequency $f_i$. The output of the converter 32 is applied through an output conductor 52 to a direct current torquer motor 34. Torquer motor 34 is coupled by suitable mechanical means 54 to the shaft 22 and rotates the shaft 22 at a rate $\omega_o$ and in a sense so as to counteract the inertial rate $\omega_i$.

A single axis stabilization system including laser ring 1 as arranged in accordance with FIGS. 1 and 2, and constructed in accordance with the block diagram of FIG. 3, is shown in FIG 4. The system shown in FIG. 4 includes a gimbal 36 having a pivot shaft 22A and a pivot shaft 22B, with gimbal 36 journaled in a navigational instrument case 3 by the shaft 22A rotatably mounted in a bearing 5 carried by the case 3 and the shaft 22B rotatably mounted in a bearing 7 carried by the case 3. Pivot shafts 22A and 22B are co-axial with shaft 22, as shown in FIGS. 2 and 4. Gimbal 36 has complete freedom of rotation about axis Y—Y and is sensitive to the inertial rate $\omega_i$. Gimbal 36 may be of the type which provides through a synchro 37 mounted on the shaft 22B an electrical output corresponding to the angular displacement of gimbal 36 about axis Y—Y.

Laser ring 1 is supported by the table 20 mounted to the shaft 22 and includes the tube 2, the mirrors 8, 10, 12 and 14 and the photodetector 16 arranged as heretofore described with reference to FIG. 1. Oscillator 19 provides at the output conductor 21 an electrical output having the frequency $f_c$ which is applied through the output conductor 21 to frequency divider 23, with the frequency divider 23 providing at the output conductor 34 an output for driving the motor 24 at the rate $\omega_c$ as heretofore noted. The output of the frequency divider 23 is applied through the output conductor 34 to the synchronous motor 24 which is mounted to gimbal 36, with the motor 24 having an output shaft 25 journaled in one end of a supporting member 33 by a bearing 34. The other end of the supporting member 33 is mounted to the gimbal 36. Gear means 27 includes a gear 35 affixed to the shaft 25 of the motor 24 and a gear 38 affixed to the shaft 22, with gears 35 and 38 being in meshing engagement. Shaft 22 is journaled in one end of a supporting member 31 by a bearing 41. The other end of the supporting member 31 is mounted to the gimbal 36.

Photodetector 16 of laser ring 1 provides at the output conductor 40 an electrical output having the frequency $f = f_c + f_i$. The electrical output from photodetector 16 having the frequency $f = f_c + f_i$ is applied through the output conductor 40, and the electrical output from oscillator 19 having the frequency $f_c$ is applied through the output conductor 42 joining the output conductor 21 at the point 42, to the detector 28 which algebraically subtracts the outputs and provides at the output conductor 46 an electrical output having the frequency $f_i$. The output of detector 28 is applied through the conductor 48 joining the conductor 46 at the point 50 to the converter 32 which provides at the output conductor 52 a direct current output corresponding to the frequency $f_i$, with this output being applied through the output conductor 52 to the torquer 34. Torquer 34 has a stator which is mounted on the case 3 and a rotor which is affixed to the pivot shaft 22A of gimbal 36 causing gimbal 36 to rotate at an angular rate $\omega_o$ to counteract the inertial rate $\omega_i$, thereby stabilizing gimbal 36 about axis Y—Y with respect to inertial space.

OPERATION

The device constructed in accordance with the present invention provides novel means for sensing the angular rate of a rotating element such as the gimbal 36, and for stabilizing the gimbal 36 with respect to inertial space.

The gimbal 36 is rotatably mounted so as to be sensitive to the inertial rate $\omega_i$. Laser ring 1, rotating at the rate $\omega_a = \omega_i + \omega_c$ provides an electrical output at photodetector 16 thereof which has a frequency $f = f_c + f_i$. The electrical output from the laser ring 1 and the electrical output from the oscillator 21 are applied to detector 28. Detector 28 algebraically subtracts the electrical outputs and provides an output having the frequency $f_i$. The electrical output from detector 28 is applied to the converter 32 which provides an electrical output for driving the rotor of the torquer 34. Torquer 34 has a stator affixed to case 3 and a rotor keyed to the pivot shaft 22A of the gimbal and rotates the gimbal 36 at a rate and in a sense to counteract the angular inertial rate $\omega_i$, thereby stabilizing gimbal 36 with respect to inertial space.

Although only one embodiment of the invention has been illustrated and described, various changes in the forms and relative arrangements of the parts, which will now appear to those skilled in the art may be made without departing from the scope of the invention. Reference is, therefore, to be had to the appended claims for a definition of the limits of the invention.

What is claimed is:

1. An inertial stabilization system, comprising:
    an oscillator for providing an electrical output at a predetermined frequency;
    a laser ring supported by a gimbal, said gimbal and said laser ring being sensitive to inertial rate of rotation;
    a motor connected to the oscillator and connected to the laser ring and responsive to the oscillator output for rotating the laser ring at a predetermined rate so that the laser ring rotates at a rate which is the sum of the inertial and predetermined rates and provides an optical output corresponding to said sum;
    transducer means coupled to the laser ring for converting the optical output therefrom to a proportional electrical output;
    a detector connected to the transducer means and connected to the oscillator for detecting the frequency difference between the electrical outputs from the transducer means and the oscillator and for providing a difference output having a frequency corresponding to inertial rate of rotation; and
    feedback means connected to the gimbal and responsive to the detector output at a frequency corresponding to the inertial rate for stabilizing the gimbal with respect to inertial space, about an axis which is perpendicular to the plane in which the optical axis of the ring laser cavity lies.

2. A system as described by claim 1, wherein the feedback means includes:
    a torquer motor connected to the comparator and connected to the gimbal, and responsive to the comparator output for rotating the gimbal at a rate which stabilizes the gimbal with respect to inertial space.

References Cited

UNITED STATES PATENTS

| | | | |
|---|---|---|---|
| 3,332,314 | 7/1967 | Rosenthal | 356—106 |
| 3,269,024 | 8/1966 | Fischer et al. | 33—226 |
| 3,345,909 | 10/1967 | De Maria | 356—28 |
| 3,330,945 | 7/1967 | Gevas | 235—150.25 |
| 3,373,650 | 3/1968 | Killpatrick | 356—106 |
| 3,392,622 | 7/1968 | Senf | 356—106 |
| 3,395,270 | 7/1968 | Speller | 235—150.25 |

OTHER REFERENCES

King, "Lasers and Their Application to Navigation," J. Inst. of Navigation, vol. 17, 1964 (pp. 299–305).

RONALD L. WIBERT, Primary Examiner

R. J. WEBSTER, Assistant Examiner

U.S. Cl. X.R.

235—150.25; 331—94.5; 356—110, 112